(12) United States Patent
Renaud-Goud

(10) Patent No.: US 9,158,280 B2
(45) Date of Patent: *Oct. 13, 2015

(54) HOLOGRAPHIC PROJECTION DEVICE FOR THE ENLARGEMENT OF A VISIBILITY REGION

(71) Applicant: SeeReal Technologies S.A., Munsbach (LU)

(72) Inventor: Philippe Renaud-Goud, Lyons (FR)

(73) Assignee: SEEREAL TECHNOLOGIES S.A., Munsbach (LU)

( * ) Notice: Subject to any disclaimer, the term of this patent is extended or adjusted under 35 U.S.C. 154(b) by 263 days.

This patent is subject to a terminal disclaimer.

(21) Appl. No.: 13/680,174

(22) Filed: Nov. 19, 2012

(65) Prior Publication Data

US 2013/0070321 A1 Mar. 21, 2013

Related U.S. Application Data

(62) Division of application No. 12/520,188, filed as application No. PCT/EP2007/063801 on Dec. 12, 2007, now Pat. No. 8,314,982.

(30) Foreign Application Priority Data

Dec. 21, 2006 (DE) .......................... 10 2006 062 413

(51) Int. Cl.
*G03H 1/08* (2006.01)
*G03H 1/22* (2006.01)

(52) U.S. Cl.
CPC ............... *G03H 1/08* (2013.01); *G03H 1/2294* (2013.01); *G03H 2001/221* (2013.01); *G03H 2001/2239* (2013.01)

(58) Field of Classification Search
None
See application file for complete search history.

(56) References Cited

U.S. PATENT DOCUMENTS 8,314,982 B2 * 11/2012 Renaud-Goud .................. 359/9

* cited by examiner

*Primary Examiner* — Arnel C Lavarias
(74) *Attorney, Agent, or Firm* — Saul Ewing LLP

(57) ABSTRACT

A holographic projection apparatus and a method for magnifying a virtual visibility region, for observing a reconstructed scene with at least one light modulation device and with at least one light source having sufficiently coherent light for generating a wavefront of a scene that is coded in the light modulation device. By means of imaging the wavefront into a viewer plane, it is possible to generate the virtual visibility region for observing the reconstructed scene. The virtual visibility region has at least two virtual viewer windows. In this case, the virtual viewer windows are dimensioned such that the reconstructed scene can always be observed without tracking of the viewer windows upon movement of a viewer in the viewer plane.

11 Claims, 4 Drawing Sheets

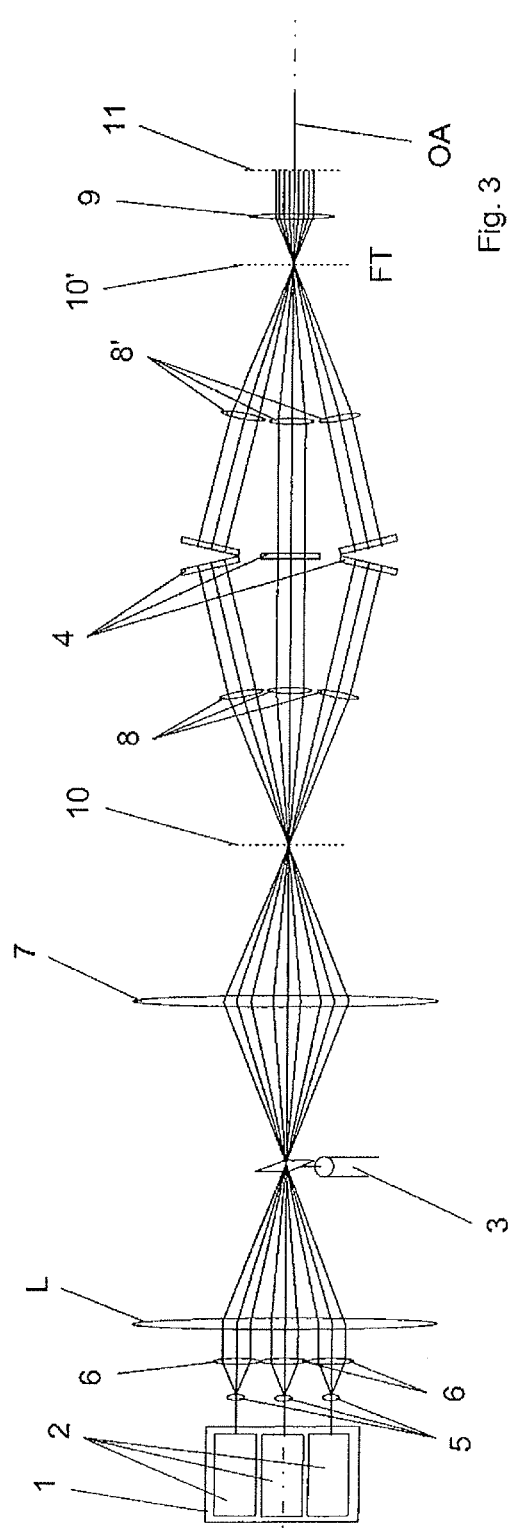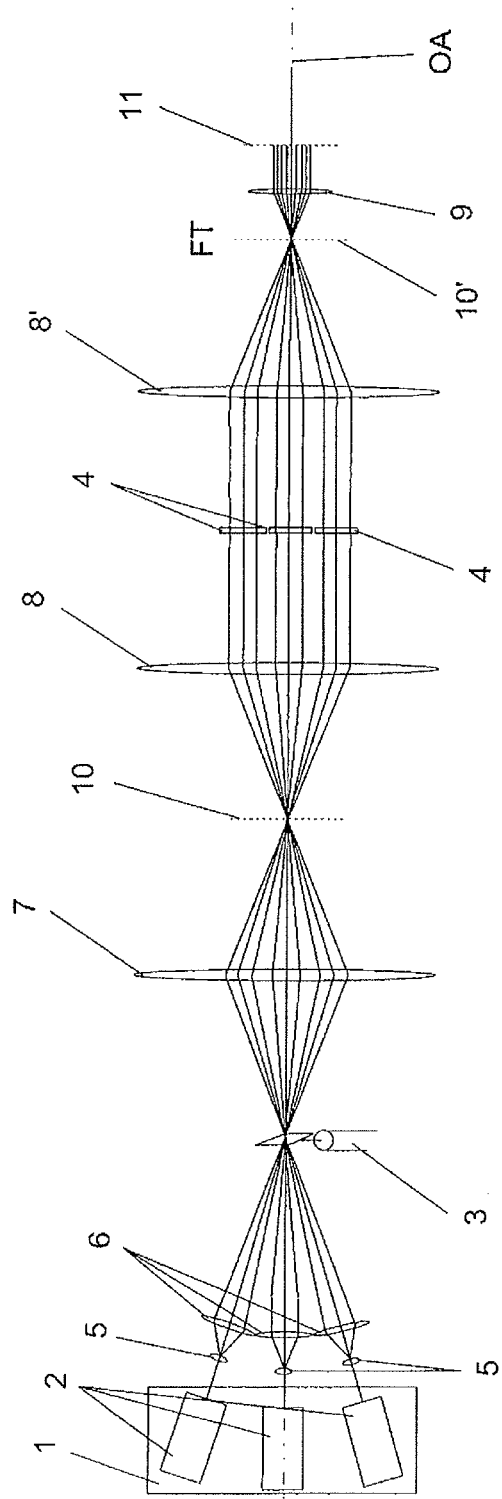

HOLOGRAPHIC PROJECTION DEVICE FOR THE ENLARGEMENT OF A VISIBILITY REGION

CROSS REFERENCE TO RELATED APPLICATIONS

This application is a divisional of U.S. application Ser. No. 12/520,188, filed Nov. 24, 2009, which claims the priority of PCT/EP2007/063801, filed on Dec. 12, 2007, which claims priority to German Application No. 10 2006 062 413.0, filed Dec. 21, 2006, all of which are hereby incorporated in total by reference.

FIELD OF THE INVENTION

The claimed invention relates to a holographic projection device for the enlargement of a visibility region for watching a reconstructed scene, said device comprising at least one light modulator device and at least one light source which emits sufficiently coherent light so as to generate a wave front of a scene which is encoded on the light modulator device. This invention further relates to a method for the enlargement of a visibility region with the holographic projection device.

BACKGROUND OF THE INVENTION

If most displays are looked at, the observer can only see a flat pixel plane. However, it is desired to look at a display and to see the objects presented on it in a three-dimensional view that is in a realistic manner. Various attempts have been made in this respect in order to find a satisfactory solution for this problem. One solution is volumetric displays, which can generate a three-dimensional image, but which require a complicated apparatus. Further, autostereoscopic displays with lenticular arrays are known from prior art documents. However, these display devices do not represent a true three-dimensional image. At present, the best solution of generating a three-dimensional image is to take advantage of holography. Holography provides a true three-dimensional image with a desired depth accommodation (movement parallax etc.) and high resolution.

EP 1 467 263 A1, for example, discloses a holographic display device for reconstructing a three-dimensional scene. That display device comprises a reflective light modulator, a beam splitter for projecting a hologram, an aperture stop, a field lens and a collimator lens. The hologram is generated on a computer using three-dimensional object information and then presented on the light modulator. The light modulator is illuminated with light emitted by a light source and projected through the beam splitter, such that a three-dimensional scene is reconstructed. The reconstructed scene is generated near the field lens. However, the dimension of the scene is adversely limited by the size of the field lens. Further, the observer of the reconstructed scene only has limited freedom of movement, because a tracking facility for an observer eye has not been proposed. Moreover, periodical repetitions of the diffraction orders appear in the Fourier plane.

Spatial light modulators (SLM) used accordingly modulate the phase and/or amplitude of light. Generally, such a light modulator has more than one million modulation elements, which are referred to as pixels. In order to achieve a high resolution, and thus to get a large visibility region and a large reconstructed scene, the light modulator is desired to have a large number of pixels. Because the trend towards miniaturisation is progressing at a fast pace, the light modulators are constantly required to become smaller. As the pixel size can hardly be reduced further, however, it has hitherto not been possible from a technological point of view, or it is at least very difficult, to achieve a large number of pixels on the light modulator with discretely controllable optical properties.

One possibility of enlarging the visibility region is described in "Electro-holographic display using 15 mega pixels LCD", Proc. of SPIE Volume 2652, pp. 15 to 23, K. Maeno et al. In that display, five light modulators are horizontally arranged, whereby the total pixel number of the display becomes about 15 million pixels. Such a high pixel number of the display allows the reconstructed scene and the visibility region to be enlarged, so that an observer can watch the reconstructed scene with both eyes, i.e. binocularly. However, the disadvantage of such a display is that the light modulators, or more precisely the light emitted by the light modulators exhibits mutual coherence, so that the coherent light is superimposed and disturbing interference effects such as speckles occur. Further, it is difficult to make such a display, because the multiple mirrors needed for beam guidance must be precisely aligned.

Another way of enlarging the visibility region is described in the yet unpublished document DE 10 2006 024 356.0. The projection device disclosed therein comprises a two-dimensional light modulator device in a scanning system, where the light scans one after another multiple one-dimensional pixel arrangements of the light modulator device with the help of a scanning element. A wave front modulated with the help of the light modulator device is imaged into a virtual visibility region or on to a screen. In order for the observer to be able to watch the reconstructed scene even if he moves, it is necessary to track the virtual visibility region to the respective observer eye. Although it is generally possible to watch the reconstructed scene binocularly, this is difficult to achieve.

SUMMARY OF THE INVENTION

It is thus an object of the present invention to provide a holographic device and a method which prevail over the afore-mentioned disadvantages of the prior art, and which allow two- and/or three-dimensional scenes to be watched through a large visibility region, in particular if one or multiple observers move, without the need to track the respective observer windows. Further, DE 10 2006 024 356.0 shall be improved such that multiple observers can simultaneously watch a reconstructed scene.

According to the claimed invention, the virtual visibility region for watching the reconstructed scene can be generated by way of imaging the wave front into an observer plane, whereby the virtual visibility region has at least two virtual observer windows which are dimensioned such that the reconstructed scene can always be watched without the need to track the observer windows if an observer moves in the observer plane.

The holographic projection device comprises at least one light source which emits sufficiently coherent light, and at least one light modulator device. In this document, the term 'sufficiently coherent light' denotes light which is capable of generating interference for the reconstruction of a three-dimensional scene. The light modulator device comprises pixels (modulation elements), in which the scene to be reconstructed is encoded. A virtual visibility region is generated in an observer plane for an observer to be able to watch the reconstructed scene. The 'virtual visibility region' shall be construed in the context of the present invention to be a virtual window area which is generated to be large enough for an observer to watch the reconstructed scene binocularly. This is achieved in that the virtual visibility region exhibits multiple—i.e. at least two—observer windows which preferably lie side by side, and which are dimensioned such that one observer can watch the reconstructed scene without the need to track the observer windows if he moves in the observer plane in a region which is possibly defined.

A holographic projection device is thus provided for a simple and quick reconstruction of two- and three-dimensional scenes in a reconstruction volume which is as large as possible. An observer can thus watch the reconstructed scene binocularly through the visibility region, because the visibility region comprises multiple observer windows through which a reconstructed scene is visible. This multitude of observer windows always allows the reconstructed scene to be viewed binocularly without the need to track the observer window for the respective eye to a new observer eye position if the observer moves in the observer plane. The need to track the observer window is thus greatly minimised or even eliminated. Tracking means can thus be omitted in the present holographic projection device according to this invention, which makes the design of the projection device much simpler and compact.

According to a preferred embodiment of the invention, at least one deflection element is provided for the generation of the virtual visibility region with at least two observer windows. The deflection element makes it possible to generate a large visibility region which comprises multiple observer windows, in particular in the horizontal direction, which is the coherent direction here. However, if it is necessary to enlarge the visibility region likewise also in the vertical direction, then a deflection element will be necessary which is able to deflect the light in both the horizontal and vertical directions, such as for example an x-y galvanometer.

It can be particularly preferable if the visibility region can be reproduced using at least one beam splitter element in order to enable multiple observers to watch the reconstructed scene. This is preferably made possible by a holographic projection device for multiple observers, e.g. at events, in cinemas etc., without the need to detect each individual observer by a position detection system and to track the respective observer windows when individual observers move. This way, the observer can move freely within his large visibility region. This substantially simplifies the holographic projection device and the corresponding method for the reconstruction of a scene and for the presentation of the same to the observer(s).

According to a further embodiment of the invention, if multiple light sources are used, their light is preferably mutually non-coherent. In particular if multiple light sources are used for multiple light modulator devices, it is desired that the light of those light sources is mutually non-coherent, because the light is then only superimposed in its intensity, thus minimising or preventing the occurrence of disturbing interference effects (speckles). This substantially improves the quality of the reconstructed scene.

An object of the present invention is further solved by a method for the enlargement of a virtual visibility region for watching a reconstructed scene, where at least one light source emits sufficiently coherent light, and where the light is modulated by at least one light modulator device, and where the modulated light is then projected through at least one imaging element on to at least one deflection element, whereby the virtual visibility region is generated in a pre-defined position in at least one observer plane with the help of the modulated light, where at least two observer windows are generated in the virtual visibility region using a multiplexing method.

The light which is modulated by the at least one light modulator device is imaged in at least one observer plane and generates a virtual visibility region there. This visibility region is enlarged with the help of a multiplexing method by generating observer windows which are strung together, in order to enable an observer to watch a reconstructed scene binocularly in a reconstruction volume. The visibility region can be made large enough for the observer to be able to continue watching the reconstructed scene or reconstructed scenes even if he changes his position. It is thus no longer necessary to track the observer window, as known from document DE 10 2006 024 356.0. The method for the reconstruction of scenes is substantially simplified preferably if the spatial division multiplexing method is used, thus making possible a true real-time representation of a moving two- and/or three-dimensional scene.

In a preferred embodiment of the invention, the at least two observer windows in the virtual visibility region can be generated using a time division multiplexing method. This is particularly advantageous if the at least one light modulator device is capable of generating the virtual observer windows in the virtual visibility region at a very high speed and if their resolution is sufficiently high. The number of light modulator devices for the generation of the observer windows can thus be reduced to few modulators, or even to just one modulator. This simplifies the design of the holographic projection device. If multiple light modulator devices are used, it is of course also possible to generate the virtual observer windows using a spatial division multiplexing method.

It can be particularly preferable if a Fourier transform of the light emitted by the light source and modulated by the at least one light modulator device is imaged on to an imaging element which serves as a screen, where at least this imaging element images a wave front modulated with the help of the light modulator device into the virtual visibility region. Due to the discrete recording and because of the effects of diffraction, the reconstruction of a computer-generated hologram (CGH) is only possible within one periodicity interval of the diffraction spectrum, which is defined by the resolution of the CGH-carrying medium, namely the light modulator device. The reconstruction is typically repeated showing irregularities in adjacent periodicity intervals. The problem of periodic continuations of the diffraction orders of the Fourier transform is solved here by imaging the Fourier transform on to the screen. The reproduction scale and the size of the screen can be chosen such that the periodic continuation of diffraction orders lies outside the screen. As a consequence, only one period is represented on the screen. This means that an observer of the reconstructed scene does not perceive the periodic continuation of the reconstruction in the diffraction orders. This greatly improves the reconstruction quality of the holographic projection device. If the wave front was imaged into the observer plane as the Fourier transform of a hologram encoded on the light modulator device, the periodic continuation in the visibility region would disturb the observer in watching the reconstructed scene because multiple observer windows would be generated.

Further embodiments of the invention are defined by the other dependent claims. Embodiments of the present invention will be explained in detail below and illustrated in conjunction with the accompanying drawings. The principle of the invention will be explained based on a holographic reconstruction with monochromatic light. However, it will appear to those skilled in the art that this invention may as well be applied to colour holographic reconstructions, as indicated in the description of the individual embodiments.

BRIEF DESCRIPTION OF THE DRAWINGS

FIG. 3 is a top view which shows schematically the scanning system according to FIG. 1, where multiple light sources are provided.

FIG. 4 is a top view which shows schematically the scanning system according to FIG. 2, illustrating another possibility of arranging the light sources.

DETAILED DESCRIPTION

Now, the design of the holographic projection device according to this invention and the reconstruction of a scene, preferably a three-dimensional scene, will be described.

Figure 1:
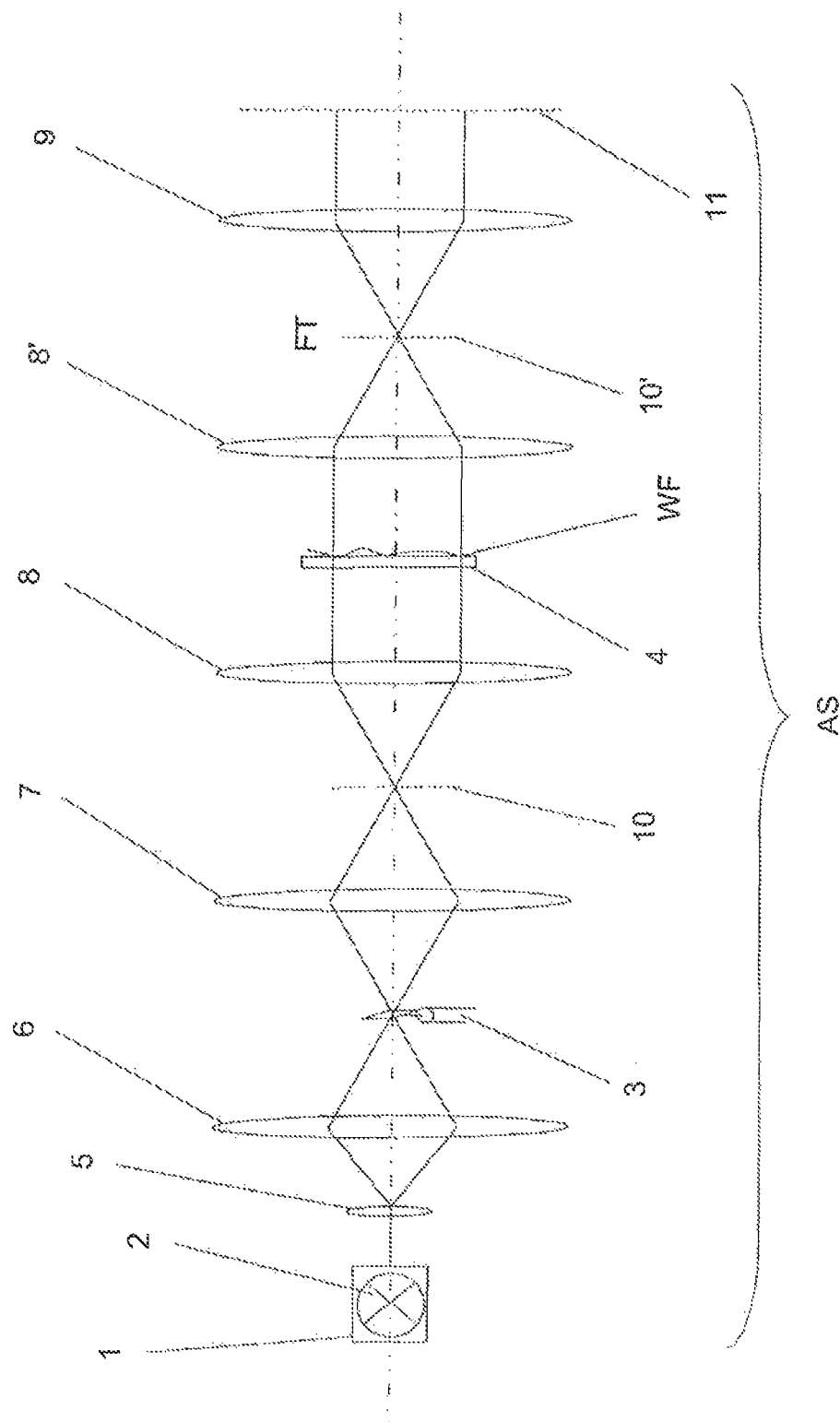
FIG. 1 shows the principles of a scanning system known from document DE 10 2006 024 356.0 and illustrates the direction of propagation of the wave fronts and the direction of light propagation (coherent direction).

FIG. 1 only shows a sub-system of the holographic projection device, where a non-folded optical path is shown through deflection elements. This sub-system is referred to as the scanning system AS. It comprises an illumination device 1 with at least one light source 2, a scanning element 3, at least one light modulator device 4 and imaging elements 5, 6, 7, 8, and 9, where each imaging element 6, 7, and 9 can consist of multiple single optical elements. The imaging elements 5, 6, 7, 8, and 9 can be lenses, in particular cylindrical lenses, spherical lenses, corrected cylindrical or spherical lenses, diffractive optical elements (DOE), Fresnel lenses, but also mirrors or arrangements of several such elements. Further, the imaging elements 5, 6, 7, 8, and 9 can also be disposed off-axis, which helps to reduce aberrations, such as field curvature. The holographic projection device is anamorphic, i.e. the projection systems and thus the degrees of magnification in two directions of the projection device which are perpendicular to each other are different. FIG. 1 shows the scanning system AS in the direction of propagation of the wave fronts and in the direction of light propagation. This direction will be referred to below as the coherent direction. The scanning system AS in the scanning direction and in the direction of light propagation, which is referred to as the non-coherent direction, is not shown in this embodiment, because it can be seen in DE 10 2006 024 356.0 and because it is not relevant for the present invention.

Now, the functional principle of the scanning system AS in the coherent direction will be described with reference to FIG. 1. It is advantageous if diffractive optical elements are used as imaging elements, because their design and functional principle are better suited to achieve aberration correction. The light source 2 of the illumination device 1 emits sufficiently coherent light, which is directed on to the imaging element 5 for broadening. The plane wave W then passes through the imaging element 6, which is for example a cylindrical lens, and is focussed on to the scanning element 3. The scanning element 3 is then imaged by the imaging element 7 into a plane 10 such that the wave W, which is focussed on the scanning element 3, is also focussed in this plane 10. It is thereby possible to dispose a deflection element, such as a mirror, in plane 10 in order to fold the optical path. If a reflective light modulator device 4 is used, the deflection element is advantageous to prevent the light on the way to the light modulator device 3 from overlapping with the light on the way back. Also if a transmissive light modulator device 4 is used, such a deflection element may be used for reasons of compactness. After having passed plane 10, the wave W is projected by the imaging element 8 as a collimated wave or plane wave on to the light modulator device 4. The light modulator device 4 is a reflective light modulator device in this embodiment and in the embodiments described below, in particular those according to FIGS. 1, 2 and 3, which means that there is a folded optical path, so that a wave W with a preferably plane wave front is reflected as a modulated wave with a wave front WF. The wave front WF thus modulated by the light modulator device 4 is then imaged by the imaging elements 8' and 9 into a plane 11. In the case a reflective light modulator device 4 is used, as in this embodiment, the imaging element 8 also serves as the imaging element 8'. The two imaging elements 8 and 8', which are shown as separate imaging elements here, are in this case combined so as to form one single imaging element. However, this only applies to reflective light modulator devices 4. While the modulated wave front WF is imaged by the imaging element 8' (=8), a Fourier transform FT is generated at the same time in a plane 10'. If a reflective light modulator device 4 is used, the planes 10 and 10' coincide so as to form one and the same plane. The wave front WF is then directed by the imaging element 9 on to the plane 11 as a collimated bundle of rays. Because this embodiment and any other embodiments described below are only shown schematically, it must be noted that the imaging elements 8 and 8' are represented by one single imaging element, so that the modulated wave front WF is reflected back into plane 10'. Planes 10 and 10' thus coincide.

A description of the functional principle of the scanning system AS in the non-coherent direction will be omitted here, because this is explained clearly in document DE 10 2006 024 356.0.

Figure 2:
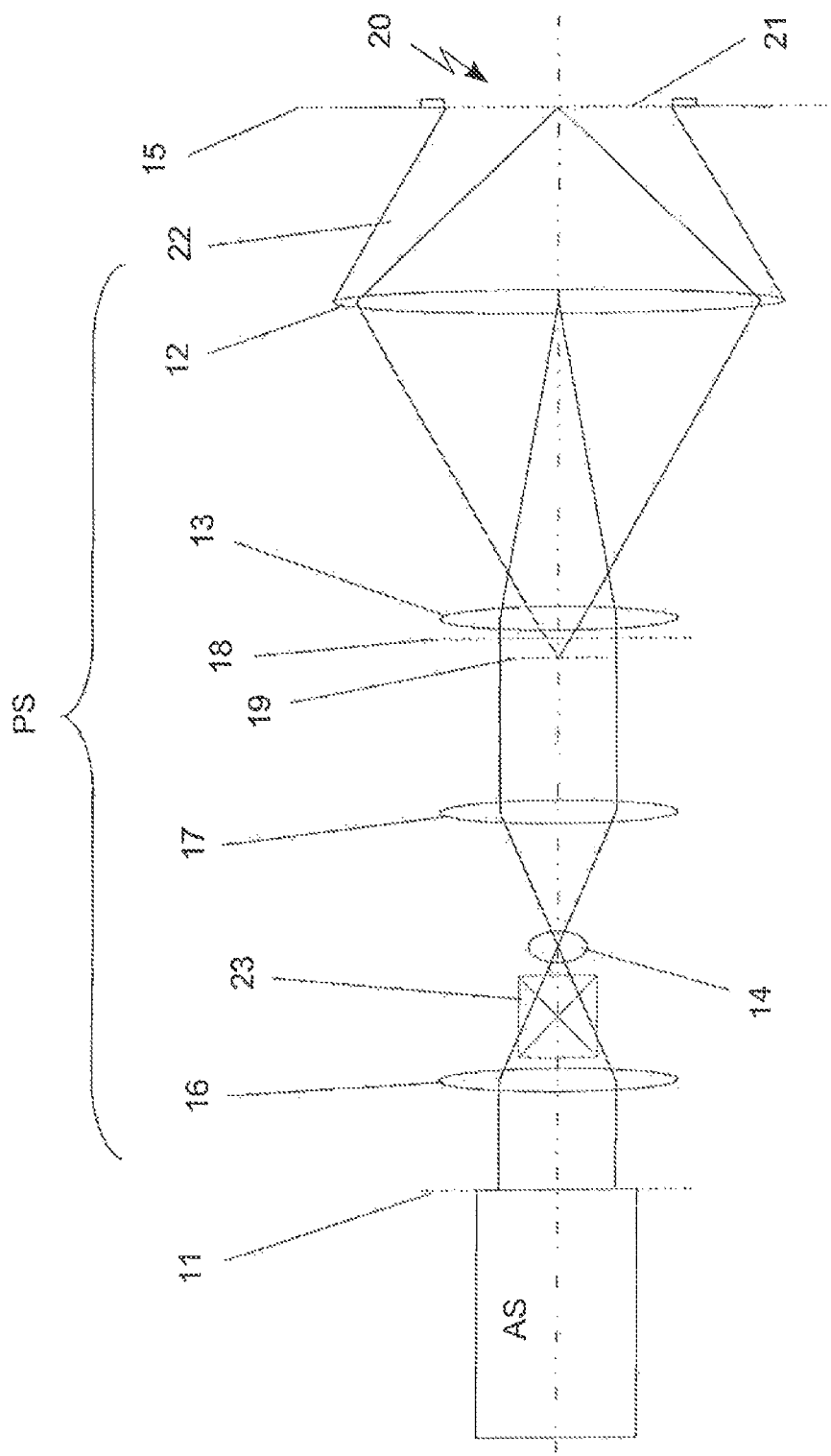
FIG. 2 shows schematically a holographic projection device known from document DE 10 2006 024 356.0 with the scanning system according to FIG. 1 and a projection system.

FIG. 2 shows the holographic projection device as a whole. The holographic projection device comprises the above-mentioned scanning system AS, only shown schematically here, and a projection system PS. The projection system PS comprises an imaging element 12 which serves as a screen, and at least one further imaging element 13. The imaging element 12, which will be referred to as a screen below, can for example be a mirror, lens or diffractive optical element (DOE). The screen 12 is disposed in the second focal plane of the imaging element 13. The imaging element 13 can be a lens, DOE, lens arrangement or similar optical element, in particular an arrangement of spherical and cylindrical lenses, so that preferably different degrees of magnification will be achieved in the coherent and in the non-coherent direction. The projection system PS is further coupled with a deflection element 14, which is provided for the enlargement of a virtual visibility region in an observer plane 15. The deflection element 14 is disposed between two imaging elements 16 and 17, which form an afocal system. The deflection element 14 is of an individually controllable type, preferably a mirror element and can for example be a galvanometer scanner, an array of MEMS (micro electro-mechanical systems), a polygon scanner or an acousto-optic arrangement. Further, the deflection element 14 can deflect in at least one direction (horizontal and/or vertical). The wave front, which carries the information required to reconstruct a three-dimensional scene, is generated in the scanning system AS, as described under FIG. 1. This is why only the reconstruction in the projection system PS will be described with reference to FIG. 2. The afocal system represented by the imaging elements 16 and 17 images the plane 11 through the deflection element 14 into a plane 18. Referring to FIG. 2, this plane 18 is then imaged by the imaging element 13 into a plane 19 as a virtual image, which is then imaged by the screen 12 into the observer plane 15, where it generates a virtual observer window 21 which is intended for one eye, said observer window 21 thus representing a virtual visibility region 20. At the same time, the deflection element 14, which is disposed in the focal plane of the imaging element 16, is imaged by the imaging elements 17 and 13 on to the screen 12. In the coherent direction, the modulated wave front WF is thus imaged into plane 11 in the scanning system AS, and then into the virtual observer window 21 and on to the eye of an observer. The Fourier transform FT of the modulated wave front WF is at the same time imaged by the imaging element 16 on to the deflection element 14. In the non-coherent direction (not shown), the scanning element 3 is imaged into plane 11 in the scanning system AS, and the beams are imaged into infinity or collimated once they have passed the imaging element 9. The scanning element 3 is then imaged into the virtual observer window 21. At the same time, the beams are focussed on the deflection element 14 and imaged by the imaging elements 17 and 13 on to the screen.

The imaging elements 17 and 13 can also be combined so as to form one single lens or a lens array. The above-mentioned holographic projection device was only illustrated and described for one observer eye; however, it can also be designed for a pair of observer eyes if the virtual observer window 21 is sufficiently large, which is difficult to achieve though. Alternatively, a pair of observer eyes can preferably be served by a second light modulator device 4 for a second observer eye; then a number of modifications must be applied to the projection device. If the observer is situated in the observer plane 15 and looks through the virtual visibility region 20, here in particular through the virtual observer window 21, he can watch the reconstructed three-dimensional scene in the reconstruction volume 22, where the scene is reconstructed in front of, on or behind the screen 12, seen in the direction of light propagation.

Colour reconstruction of the three-dimensional scene is also possible with the help of the holographic projection device. For this, at least one beam splitter element 23, preferably an X prism containing dichroic layers, is disposed in front of the deflection element 14, seen in the direction of light propagation. Alternatively, the beam splitter element 23 can be disposed at any other suitable position in the holographic projection device. Colour reconstruction of the scene is achieved by simultaneously processing the three primary colours, RGB. If two fully separated light channels are provided, two beam splitter elements 23, i.e. one beam splitter element 23 per light channel, can be disposed in the projection system PS.

It is understood that a sequential colour reconstruction of the scene is of course possible as well. To perform this type of reconstruction, a preferably coloured light source 2, which exhibits sufficient coherence, and a switching unit are required in order to control the individual monochromatic primary colours, RGB, sequentially. This allows the colour reconstructions to be generated one after another.

FIGS. 1 and 2 illustrate the above-described holographic projection device while an observer who does not move in the observer plane 15 watches the reconstructed scene. However, if the observer moves to another position in the observer plane 15, he will no longer be able to watch the reconstructed three-dimensional scene without the virtual visibility region 20 or, in FIG. 2, the virtual observer window 21 to be tracked accordingly. The deflection element 14 can then serve to track the observer window 21. However, such tracking requires additional optical devices, such as for example a position detection system, which detects the positions of the observer eyes in the observer plane 15.

One possibility of watching the reconstructed three-dimensional scene without the need to track the observer window 21 in the observer plane 15, when the observer changes his position, is to enlarge the visibility region 20. FIGS. 3 and 4 illustrate options which can be used to achieve this.

FIG. 3 shows a scanning system AS according to FIG. 1, where the illumination device 1 comprises multiple light sources 2, here three light sources 2. The light sources 2 are arranged parallel to each other and parallel to an optical axis OA, and they should preferably be non-coherent with respect to each other for the same visibility region 20. This can be ensured for example by using different light sources, e.g. different lasers. This is particularly advantageous insofar as the light is then only to be superimposed as regards its intensity, but does not show interference. Disturbing interference effects, such as speckles, which would substantially impair the quality of the scene, can thus not occur. It is nevertheless of course also possible to use light sources 2 which exhibit mutual coherence. However, the hologram which carries the information of a scene to be reconstructed should then be divided up into multiple light modulator devices 4. Design and working principle of the scanning system AS are generally identical to those explained regarding FIG. 1. However, at least two light modulator devices 4, in this embodiment three light modulator devices 4, are provided for the enlargement of the visibility region 20 and arranged in the scanning system AS. The light modulator devices 4 are of a reflective type, and the number of the light sources 2 used is identical to the number of light modulator devices 4 for a monochromatic reconstruction. In order to combine the individual waves W, which are emitted by the light sources 2, after broadening by the respective imaging element 5 or 6, a large imaging element L is provided with collimated optical paths. Using this imaging element, the individual waves W can be focussed on the scanning element 3, so that all light modulator devices 4 are scanned simultaneously. Because the light modulator devices 4 must be arranged at an angle to the optical axis OA for this, it is necessary for each light channel to comprise behind the plane 10 an imaging element 8, so that collimated light falls on the respective light modulator device 4 in order to scan the same. The design of the projection system PS, which is disposed behind the scanning system AS, seen in the direction of light propagation, is identical to that described regarding FIG. 2. However, one deflection element 14 must be provided per light modulator device 4. Multiple virtual observer windows 21 are generated in this embodiment using a multiplexing method, here using a spatial division multiplexing method. Multiple virtual observer windows 21 of any size are thus simultaneously generated in the virtual visibility region 20. This means that the virtual observer window 21 can be made large enough to cover both eyes of an observer. However, it is also possible that the virtual observer window 21 is so small that two virtual observer windows 21 are required to cover one eye pupil. Further, there can be free space between two virtual observer windows 21 which are arranged beside one another. The entire reconstructed scene is visible through each of those individual observer windows 21, while it is also thinkable that each individual observer window 21 in the visibility region 20 shows the reconstructed scene from a different perspective.

This way, a virtual visibility region 20 can be generated which includes at least two, in this embodiment three, virtual observer windows 21 (not shown) at the same time. This substantially enlarges the virtual visibility region 20 compared with that shown in FIG. 2, so that it is now possible for an observer to watch the reconstructed three-dimensional scene binocularly. It is particularly advantageous that the modulated wave front WF is imaged into the observer plane 15 on to the observer eyes, while the Fourier transform FT is imaged on to the screen 12. In order to achieve this, the screen 12 must be disposed in the second focal plane of the imaging element 13. This way the periodic continuation of the diffraction orders is transferred to the screen 12, and displaced in particular out of the screen 12, so that only one period of the diffraction spectrum is shown on the screen 12. This means that an observer does not perceive the periodic continuation of the reconstruction in the diffraction orders. If the wave front WF is encoded as a hologram on the light modulator device 4, the Fourier transform FT will be imaged into the observer plane 15 and the modulated wave front WF will be imaged on to the screen 12. In this case, if multiple virtual observer windows 21 are generated in the virtual visibility region 20, the periodic continuations of the individual reconstructions will be substantially disturbing when watching the reconstructed three-dimensional scene. Further, a great advantage is that with such a large visibility region 20 which comprises multiple observer windows 21, successively arranged points of a reconstructed scene, i.e. points of the scene which lie in different section planes, exhibit like brightness and visibility due to the encoding. All points have the same brightness and are clearly perceivable or visible. It is thus prevented that one point is perceived sharp and another one blurred, as would be the case with a single large observer window that corresponds with the visibility region. This makes it very difficult to watch and to perceive the reconstructed scene. Because the visibility region 20 according to this invention is composed of multiple small observer windows 21, the previously used encoding method can continue to be used, thus avoiding the above-mentioned drawback which was caused by the encoding.

Further, it is advantageous if the light emitted by the light sources 2 falls areally on plane 11, whereby the respective virtual observer window 21 in the virtual visibility region 20 can be enlarged in the non-coherent direction. This means that the wider the wave front incident on plane 11 in the non-coherent direction, the larger is the virtual visibility region 20 in the non-coherent direction. It is thus advantageous if the focal length of the imaging element 9 is greater than the focal length of the imaging element 7, in order to affect the size, i.e. to enlarge, the virtual visibility region 20. This would only require a single deflection element 14, or a more simple deflection element 14 in the holographic projection device, because the virtual visibility region 20, which comprises multiple virtual observer windows 21, must only be built up horizontally.

Diffusing elements, such as diffuser foils or similar elements, can additionally be disposed in a plane which is projected on to the screen 12, in order to enlarge the virtual observer windows 21 in the non-coherent direction.

The observer can now move within the observer plane 15 in a very large visibility region 20 without the need to track the observer window 21. The observer can watch the reconstructed three-dimensional scene binocularly without any limitations from throughout this large observer mobility range.

FIG. 4 shows another embodiment of the scanning system AS for the enlargement of the visibility region 20. In this embodiment, the light sources 2 of the illumination device 1 are arranged at an angle to the optical axis OA. The light can thus fall or be focused directly on the scanning element 3 at different angles of incidence, so that the large imaging element L as shown in FIG. 3 can be omitted. In each light channel, an imaging element 5 is disposed behind the light source 2 for broadening the light, and the imaging element 6 serves for focussing. Another difference to FIG. 3 lies in the different arrangement of the light modulator devices 4. They are also of a reflective type, but are disposed parallel to each other and to the optical axis OA. General design and working principle of this scanning system AS are identical to those of the scanning system AS explained regarding FIG. 3. Design and working principle of the projection system PS, which is disposed behind the latter, seen in the direction of light propagation, are also identical to those shown in FIG. 2, and to the one mentioned above regarding FIG. 3. Again, a large virtual visibility region 20 can be generated this way in the observer plane 15, whereby the virtual observer windows 21 are again generated using a spatial division multiplexing method, as shown in FIG. 3.

Yet another possibility of enlarging the visibility region 20 in the observer plane 15 is to combine at least two scanning systems AS. The scanning systems AS can comprise multiple light modulator devices 4 and can be designed for example as shown in FIGS. 3 and 4. However, it must be ensured that the wave fronts WF, which are modulated by the light modulator devices 4 and imaged into plane 11, are attached side by side or lie next to each other or at least very close to each other. The difference to the two other, afore-mentioned options is that the individual scanning systems AS are independent of each other, because they are not coupled electronically with each other. This boasts the advantage that aberrations are less likely to occur, because the openings of the scanning systems AS are sufficiently small.

Besides spatial division multiplexing, as described regarding FIGS. 3 and 4, it is also possible to employ a time division multiplexing method for the generation of multiple virtual observer windows 21 in the virtual visibility region 20. This is particularly advantageous because the number of light modulator devices 4 can thereby be substantially reduced to only one. With time division multiplexing it is possible to use just one light modulator device 4 if it is very fast and its resolution is sufficiently high. The individual observer windows 21 are generated sequentially at a very fast pace in the observer plane 15, which results in an enlarged visibility region 20. This is why time division multiplexing should be preferred over spatial division multiplexing, because it ensures a compact design of the entire holographic projection device, and because no additional optical elements, such as light modulator devices, imaging elements, scanning elements etc. must be provided. Further, the holographic projection device can thus be manufactured more inexpensively.

Figure 5:
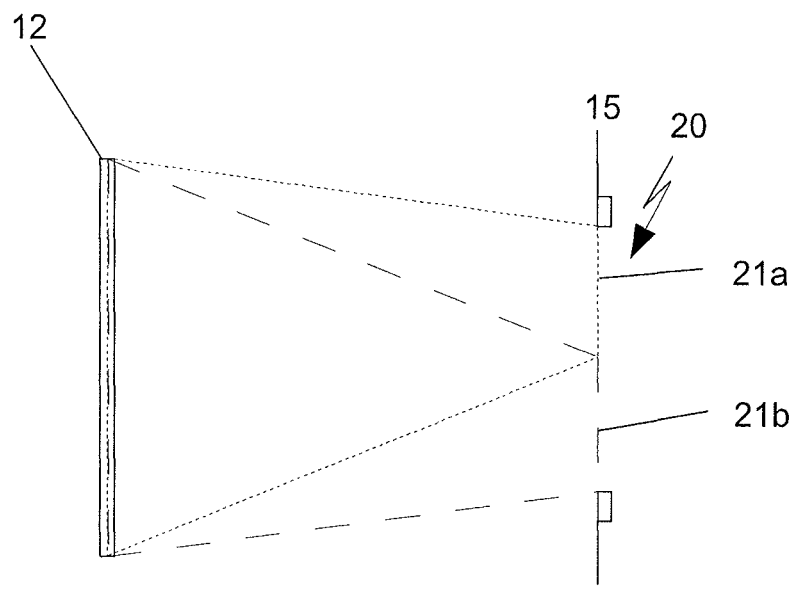
FIG. 5 shows schematically a visibility region in an observer plane.

FIG. 5 illustrates the virtual visibility region 20 in detail. It is a top view which shows the screen 12 and the virtual visibility region 20, where two virtual observer windows 21a and 21b are generated. The two virtual observer windows 21a and 21b are generated in the observer plane 15 in the virtual visibility region 20 using the spatial division multiplexing method. This means that two wave fronts WF, which are modulated by two light modulator devices 4, are imaged simultaneously through imaging elements and the screen 12 into the virtual visibility region 20, forming there two virtual observer windows 21a and 21b. The two wave fronts WF are represented by different line types in the Figure (dotted line and broken line). This can be achieved in two different ways. The first possibility is to encode the target wave front directly on the light modulator device 4 and to image it into the virtual visibility region 20. The second possibility is to start at the target observer windows 21, where all wave fronts of the observer windows 21 are simultaneously transformed into a hologram on a light modulator device 4. The wave fronts are thus encoded as a hologram and generated in the virtual visibility region 20 by way of a back-transformation on to the observer eyes.

The two virtual observer windows 21a and 21b are generated or formed such that they lie next to each other and are at least almost attached to each other. They can also be generated such that the virtual observer windows 21a and 21b are at least partly overlapped. Moreover it is possible that there is a free space left between the generated virtual observer windows 21a and 21b. As already mentioned above, the imaging of the modulated wave front WF into the virtual visibility region 20 is particularly advantageous, because the periodic continuations in the diffraction orders, as they would occur with a reconstruction of the wave front from a hologram which is encoded on the light modulator device 4, can thus be prevented. If more than two observer windows 21 are necessary, then more than two light modulator devices 4 must be provided, while the observer windows 21 are generated as described above. It is of course alternatively possible to generate the virtual observer windows 21a and 21b or more virtual observer windows 21 using the time division multiplexing method, where in the most favourable case just one light modulator device 4 will be necessary. Referring to FIG. 5, at first the observer window 21a and then the observer window 21b are generated one after another at a very fast pace through the deflection element 14. This must be done fast enough for an observer to not perceive the sequential generation of the observer windows 21a and 21b.

Using a multiplexing method, multiple virtual observer windows 21 can thus be generated in the virtual visibility region 20 in order to enlarge the virtual visibility region 20. Now, this enables an observer in the observer plane 15 to change his position and to watch the reconstructed, preferably three-dimensional scene without any restrictions without the need to detect the position of the observer eyes in order to track the virtual observer window 21 if the observer moves. Further, even a moving scene can be represented in real time without complicated additional elements and methods in a simpler and faster way, in particular if a spatial division multiplexing method is employed.

Figure 6:
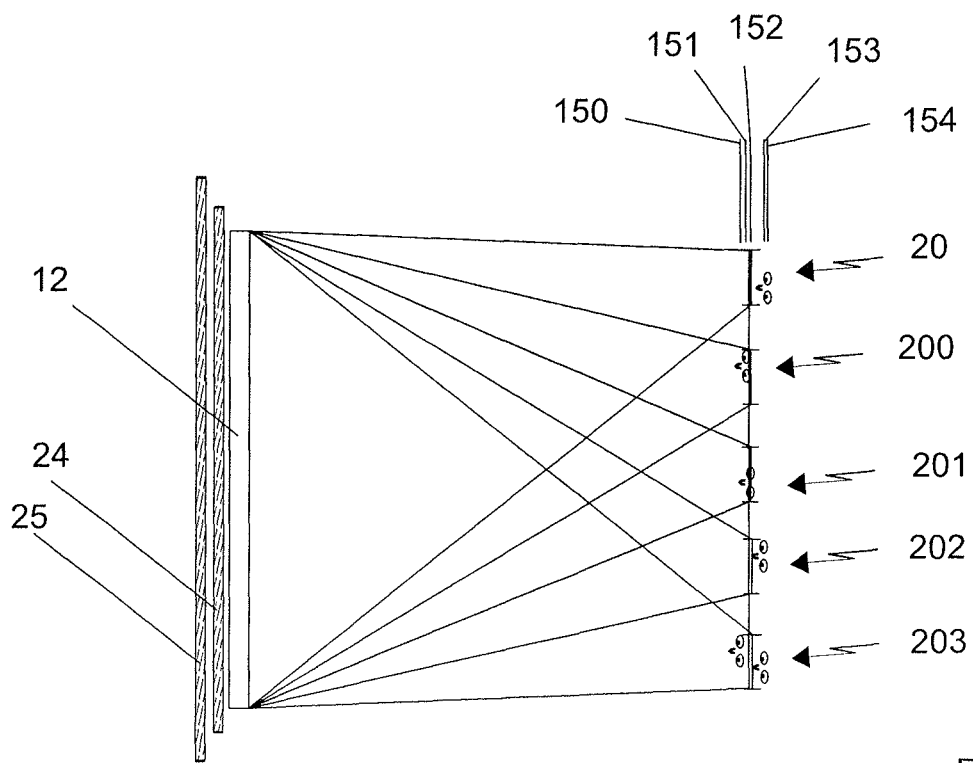
FIG. 6 shows schematically visibility regions for multiple observers in at least one observer plane.

The above-described embodiments of the holographic projection device only relate to the observation of the reconstructed three-dimensional scene by one observer. FIG. 6 shows a holographic projection device for multiple observers without the need to track the observer window 21 if an observer moves. FIG. 6 shows a small detail of the entire holographic projection device, namely the screen 12 and multiple observer planes 150, 151, 152, 153 and 154. The number of observer planes depends on the number of observers and on their position in relation to the screen 12. A virtual visibility region 20 is generated in the observer plane 154, for example, as described above under FIG. 6. In order to enable multiple observers to watch the reconstructed scene, the virtual visibility region 20 is reproduced in the observer plane 154 and in further observer planes 150, 151, 152 and 153. The virtual visibility region 20 is reproduced by at least one beam splitter element 24, so that virtual visibility regions 200, 201, 202 and 203 are generated at the observer positions in the respective observer planes 150, 151, 152 and 153. The number of observers in the observer planes 150, 151, 152, 153, 154 and so on, i.e. the number of observers watching the reconstructed scene, determines how often the virtual visibility region 20 must be copied. The at least one beam splitter element 24 is disposed in front of the screen 12, seen in the direction of light propagation, in particular in front of a last imaging element, seen in the direction of light propagation. This means that the beam splitter element 24 can be disposed either in front of the imaging element 13, or between the imaging element 13 and the screen 12, seen in the direction of light propagation. Other positions in the holographic projection device are possible as well. This way, the at least one beam splitter element 24 reproduces the virtual visibility region 20 so often that each observer can watch the reconstructed scene, even if he moves in the respective visibility region 200, 201, 202, 203 and so on. The visibility region 20 is reproduced with the help of spatial division multiplexing, where preferably multiple beam splitter elements 24, 25 are disposed in the holographic projection device. The beam splitter elements 24, 25 can for example be arranged in a cascading fashion for this. Mirror elements are provided for beam guidance to the respective observer positions in the observer planes 150, 151, 152, 153 and 154. Alternatively, the visibility region 20 can be reproduced using time division multiplexing. Tracking will then no longer be necessary.

Further, a light modulator device with micro-mirrors as modulation elements can be used in the holographic projection device according to this invention, because micro-mirrors are independent of each other. The computational power of a computing device used can be expended under simple conditions and using simple means. Further, already existing software can be used with accordingly adapted hardware implementation. The holographic projection device with light modulator devices with micro-mirrors, or with conventional light modulator devices can thus be realised using technologies which are already available.

Possible applications of the holographic projection device include displays for a two- and/or three-dimensional representation in private or working environments, for example TV screens, computer displays, electronic games, in the entertainment industry, for example for movie projections or events, in the automotive industry for displaying information, in the entertainment industry, in medical engineering, here in particular for minimally-invasive surgery applications or spatial representation of tomographically established information, and in military engineering for the representation of surface profiles. It will appear to those skilled in the art that the present holographic projection device can also be applied in other areas not mentioned above.

I claim:

1. A method for an enlargement of a virtual visibility region for watching a reconstructed scene, comprising:
    emitting sufficiently coherent light from at least one light source so as to generate a wave front of the scene being encoded on a light modulator device; and
    generating a virtual visibility region for watching the reconstructed scene by imaging the wave front into an observer plane, where the virtual visibility region comprises at least two virtual observer windows, which are dimensioned such that the reconstructed scene is watchable without tracking the observer windows if an observer moves in the observer plane, and wherein the visibility region is reproduced using at least one beam splitter element in order to enable multiple observers to watch the reconstructed scene.

2. The method according to claim 1, wherein in order to enable multiple observers to watch the reconstructed scene, the virtual visibility region is reproduced in at least one observer plane.

3. The method according to claim 2, wherein the virtual visibility region is reproduced by at least one beam splitter element, and that virtual visibility regions are generated at the respective observer positions in the at least observer plane.

4. The method according to claim 1, wherein the at least two observer windows in the virtual visibility region are generated using a spatial division multiplexing method or a time division multiplexing method.

5. The method according to claim 1, wherein the at least two observer windows are generated in the virtual visibility region such that they are at least partly overlapped.

6. The method according to claim 1, wherein the at least two observer windows are generated in the virtual visibility region such that they are at least almost attached to each other.

7. The method according to claim 1, wherein a Fourier transform of the light emitted by the light source and modulated by the at least one light modulator device is imaged on to an imaging element which serves as a screen, where at least this imaging element images a wave front modulated by means of the light modulator device into the virtual visibility region.

8. The method according to claim 1, wherein a colour reconstruction of the scene is performed simultaneously for three primary colours.

9. The method according to claim 1, wherein a colour reconstruction of the scene is performed sequentially for three primary colours.

10. The method according to claim 1, wherein a reconstructed three-dimensional scene or a reconstructed moving three-dimensional scene is displayed.

11. The method according to claim 10, wherein the reconstructed three-dimensional scene is displayed in real time.

* * * * *